United States Patent [19]
Dildy, Jr. et al.

[11] 4,103,279
[45] Jul. 25, 1978

[54] DIVER NAVIGATION SYSTEM

[75] Inventors: Clell A. Dildy, Jr.; Lyles C. Adair, both of Panama City, Fla.

[73] Assignee: The United States of America as represented by the Secretary of the Navy, Washington, D.C.

[21] Appl. No.: 818,643

[22] Filed: Jul. 25, 1977

[51] Int. Cl.² ............... G01S 9/66; G01C 23/00
[52] U.S. Cl. .................. 340/3 D; 73/178 R; 73/180
[58] Field of Search ........... 340/3 D; 73/178 R, 180

[56] References Cited

U.S. PATENT DOCUMENTS

| | | | |
|---|---|---|---|
| 2,315,755 | 4/1943 | Warner | 73/180 |
| 3,685,352 | 8/1972 | Pounder et al. | 73/178 R |
| 3,810,080 | 5/1974 | Hunter | 340/3 D |
| 4,022,150 | 5/1977 | Greene | 73/178 R |

*Primary Examiner*—Richard A. Farley
*Attorney, Agent, or Firm*—Richard S. Sciascia; Harvey A. David

[57] ABSTRACT

An underwater navigation device wherein a flux gate compass provides heading difference signals, a doppler navigation sonar provides drift angle signals, which signals are combined by a summer to provide steering correction signals that are displayed by a steering null meter.

12 Claims, 2 Drawing Figures

DIVER NAVIGATION SYSTEM

BACKGROUND OF THE INVENTION

This invention relates to navigation devices and more particularly to apparatus for providing improved underwater navigation capability to swimmer-divers, small submersibles, or the like.

Swimmer-diver navigation has been materially aided with the introduction of devices utilizing doppler effects of sonar to provide accurate data as to direction and speed of travel over the bottom. U.S. Pat. No. 3,810,080 to E. K. Hunter provides a good example of such a device which also incorporates for the diver's use a magnetic steering compass and a drift meter. The latter provides to the diver a visual indication of the amount of lateral drift he is experiencing, due to cross currents in the water.

While that device automatically gives the diver a quantitative drift indication, the amount of heading correction that he must effect to make his desired course good will require a mental computation that depends upon his skill and experience. In practice, making the necessary heading correction is made more difficult by the fact that each change in either heading or drift produces a resultant change in the other.

Moreover, it has been found that swimmer-divers using the navigation device of U.S. Pat. No. 3,810,080 experience difficulty in accurately reading the magnetic steering compass thereof while swimming and also watching the drift meter which is close to, but separate from the compass.

Accordingly, it is desirable to provide an underwater navigation device or system having a single, null type indicator that will tell the user whether he is actually heading in the proper direction to make good a predetermined desired course in spite of transverse currents and, if not, what steering correction he must effect to make the course good.

SUMMARY OF THE INVENTION

With the foregoing in mind, it is a principal object of the invention to provide an improved underwater navigation device which will enable the user to more accurately make good a predetermined course over the bottom in spite of currents transverse thereto.

Another important object is the provision of a navigation aid that will provide a single null type indication of when the user in pursuing the proper heading to compensate for drift.

Yet another object is the provision of a navigation aid that automatically combines factors of heading and drift angle to provide a quantitative and directional indication of the necessary steering corrections required.

Still another object of the invention is the provision of a navigation device or system having the foregoing features and which can readily be incorporated in a swimmer-diver manipulated unit.

A further object is the provision of a navigation device for underwater use that is reliable, accurate, and does not require auxilliary units such as beacons, transponders and the like.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
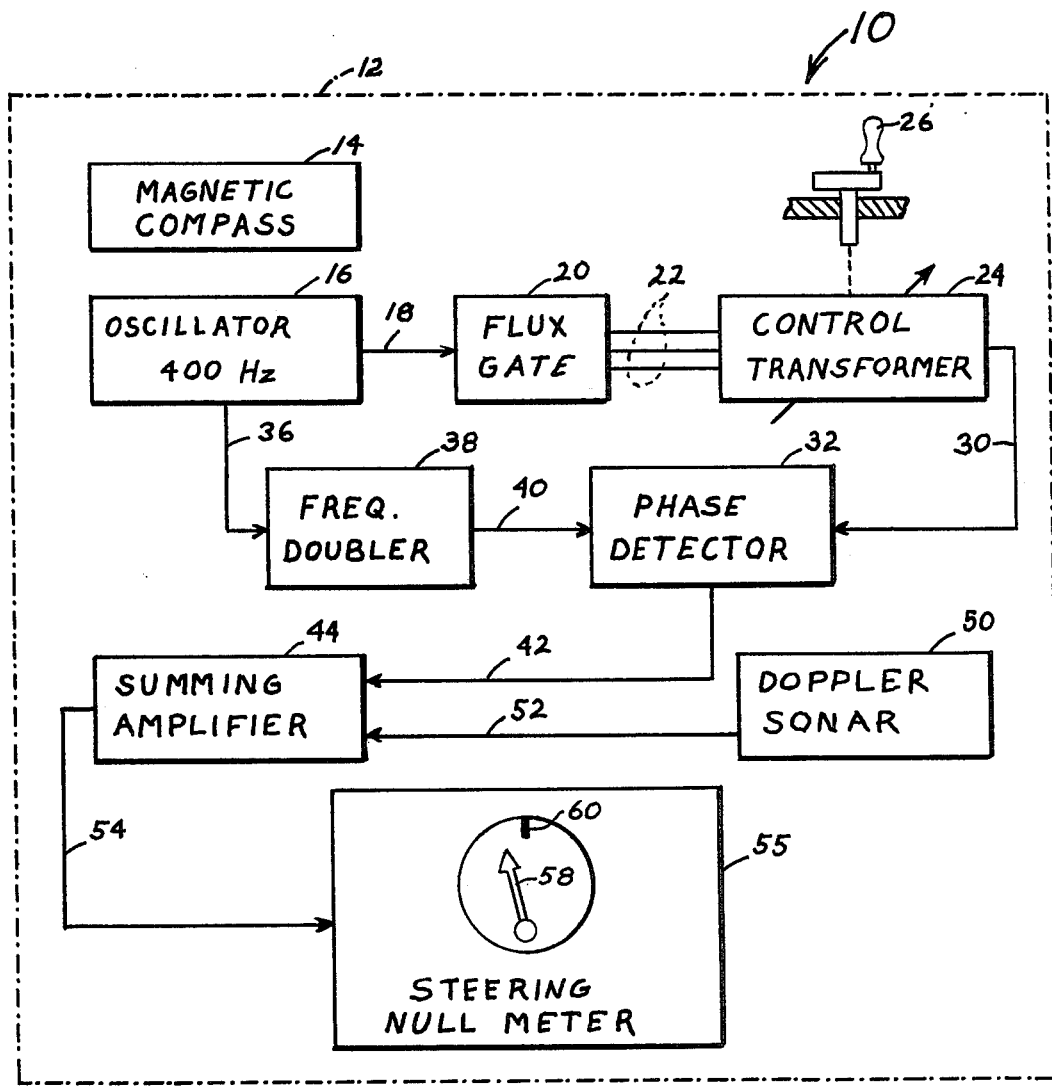
FIG. 1 is a diagrammatic illustration, in block form, of a navigation device embodying the invention.

Referring to FIG. 1, a navigation device embodying the invention is indicated generally at 10 and is carried by suitable support structure in the form of a vehicle or housing represented by the dot-and-dash line 12. The device 10 comprises a compass 14, which in this preferred embodiment is of the pivoted card magnetic type, that can be used in positioning the housing 12 on a predetermined course heading during preparations for use which will later be more completely described.

The device 10 further comprises an oscillator 16 which operates at a substantially fixed A.C. frequency of 400 Hz. The 400 Hz frequency of oscillator 16 is applied, as shown by flow line 18, as an energizing input signal to an earth inductor or flux gate 20. The flux gate 20 is conveniently of the type comprising an excitation winding associated with three delta connected induction windings. The flux gate 20 is connected, as shown by lines 22, to a variable control transformer 24, conveniently comprising three star connected inductors and having a rotatable resolver winding mechanically connected to a course setting crank 26. The output of the control transformer 24, represented by line 30, is in the form of a second harmonic A.C. signal of 800 Hz, and is applied via line 30 as one input to a phase detector 32. The latter may conveniently be in the form of a phase sensitive rectifier network.

The 400 Hz output of oscillator 16 is also applied, as shown by line 36 to a frequency doubler 38 which produces as an output, line 40, an 800 Hz signal as a reference input to the phase angle detector 32.

The output of the phase angle detector 32 is in the form of a D.C. voltage, line 42, analogous of heading differences relative to a predetermined heading selected by adjustment of the control transformer 24 by means of crank 26 in a manner and for a purpose which will be made apparent as this description precedes. The aforedescribed combination of oscillator 16, earth inductor or flux gate 20, control transformer 24, frequency doubler 38, and phase detector 32 will be recognized as the basic arrangement of an earth inductor compass. Such compasses are well known and the full theory of operation thereof need not be dealt with here. Suffice it to say that with the flux gate 20 in a desired heading position relative to the earth's magnetic field, the rotor or resolver winding of the control transformer 24 can be rotated by crank 26 to a position where the phase angle of the 800 Hz second harmonic output signal 30 will match the phase angle of the 800 Hz reference signal 40. In that condition there is a zero voltage output signal 42 from the phase detector 32, and the compass is then "set" for the desired heading. Thereafter changes in heading in one direction or the other will cause a corresponding change in phase angle of the signal 30 that will produce a heading difference signal 42 in the form of the mentioned D.C. analog voltage and which is a positive voltage for differences in one direction and negative for differences in the other direction.

The heading difference D.C. analog voltage output 42 is applied as one input to a D.C. voltage summing amplifier 44. A second voltage input to the summing amplifier 44 is derived from a doppler navigation sonar 50, the output 52 of which is analogous to drift angle $\theta$ of the vehicle or housing 12 carrying the device 10. The sonar 50 is of conventional well known construction of the type that comprises orthogonal sets of hydrophones and projectors directed toward the bottom being traversed, together with suitable resolver circuitry for providing the drift angle representing signal 52. The drift angle $\theta$, as will be understood by those skilled in the art to which the invention pertains, is a function of the lateral component of current acting on the vehicle or housing-swimmer-diver combination, and of the heading and forward speed thereof. Thus, if a heading of 090° were steered with a cross current 72, an uncorrected track 76 would be traveled. The signal 52 will be a positive voltage for drift angles $\theta$ to one side of the device heading and a negative voltage for drift angles to the other side.

The summing amplifier 44 provides a D.C. voltage output, line 54, that is analogous of the algebraic sum of heading difference signal 42 and the drift angle signal 52. The output 54 of the summing amplifier is applied to a steering null meter 56, which in the preferred embodiment comprises a zero centering microammeter having a movable needle or pointer 58 and a center reference mark or index 60.

The analog voltage signals 42 and 52 are so scaled, and the polarities so selected, that the algebraic sum thereof is zero whenever the heading difference of the device 10 is just sufficient to offset or compensate for the drift angle. In this condition the desired course is being made good.

MODE OF OPERATION

Figure 2:
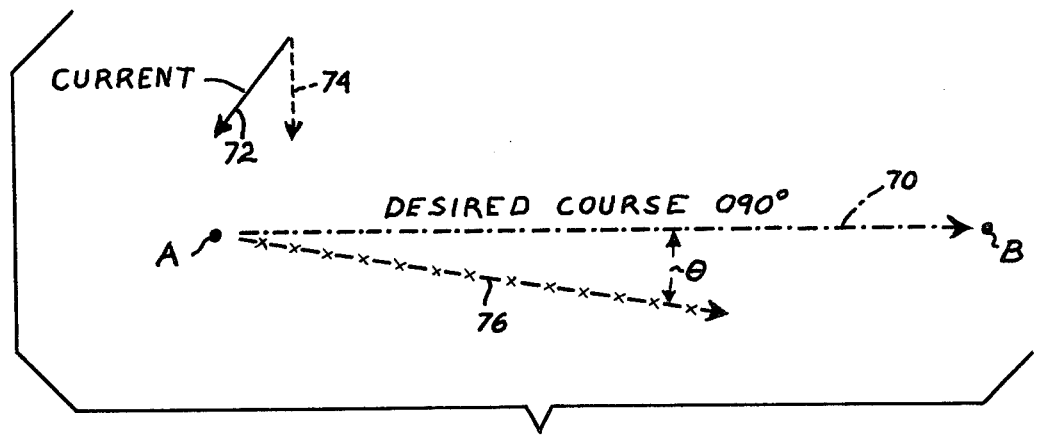
FIG. 2 is a diagrammatic illustration of the relationship between a desired course, a transverse current, and the resultant track which is avoided by the invention.

Referring now additionally to FIG. 2, consider that a swimmer-diver desires to utilize a navigation device of this invention, carried for example in steerable housing 12, to travel a desired course 70 of 090° from point A to point B, there being a current, represented by vector 72, having a component 74 acting transversely of the desired course. With the device stationary, e.g., resting on the bottom, the user points or heads it in the desired direction as determined by the magnetic compass 14. The crank 26 of the control transformer 24 is then operated in a predetermined direction, e.g., clockwise, if the pointer 58 is to the left of the index 60, until the pointer is centered on that index. If the pointer were to the right of the index, the crank is turned counter-clockwise until the pointer is centered. The earth inductor or flux gate compass portion of the device 10 is thereby set for the desired course to be made good. Following the mentioned directional procedures avoids the possibility of introducing a reciprocal heading due to the ambiguity of two zero positions of the control transformer rotor.

Now, the user can begin moving the housing 12 and included device 10 toward point B, but instead of steering by the magnetic compass 14 which was used in setting the earth inductor or flux gate compass by crank 26, the user steers by maintaining a zero or null reading on the steering null meter 58. This is done by watching the needle or pointer 58. If the pointer points to the left of the index 60, the user turns to the left until the pointer re-centers on the index. If, however, the pointer points to the right of the index, the user steers to the right to re-center the pointer. By so doing, a heading will be pursued that compensates for the currents acting on the system, and the desired course will be made good. It should be noted that, when there is a cross current, the magnetic compass heading actually pursued or steered will be to one side of the desired course set into the device, and the user should not steer by that compass, but only by the null meter.

It will be appreciated from the foregoing that the user is relieved of the difficult task of continuously monitoring separate instruments, namely a magnetic compass and a drift meter, and can avoid mentally combining the readings thereof.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An underwater navigation device for use in making good a predetermined course over the bottom, said device comprising in combination:
    a steerable support structure;
    at least a first compass means, carried by said structure, for providing a first analog signal representative of heading differences between the actual heading and said predetermined course;
    doppler sonar means, carried by said support structure and responsive to travel over the bottom, for providing a second analog signal representative of drift angle relative to said actual heading;
    summing means, responsive to said first and second analog signals, for providing a third analog signal representative of steering corrections required to make good said predetermined course; and
    indicator means, responsive to said third analog signal, for providing a sensible indication of said steering corrections.

2. An underwater navigation device as defined in claim 1, and wherein: said first compass means comprises means for adjustment thereof to select said predetermined course.

3. An underwater navigation device as defined in claim 2, and wherein:
    said first compass means comprises a flux gate compass; and
    said first analog signal is characterized as a D.C. voltage that is substantially zero when said actual heading coincides with said predetermined course, that is a positive voltage when said actual heading is to one side of said predetermined course, and is a negative voltage when said actual heading is to the other side of said predetermined course.

4. An underwater navigation device as defined in claim 3, and wherein:
    said second analog signal is characterized as a D.C. voltage that is substantially zero when said drift angle is substantially zero, that is a positive voltage when said drift angle is to one side of said actual heading, and that is a negative voltage when said drift angle is to the other side of said actual heading; and
    said first and second analog signals are so scaled and the polarities thereof so selected that said third analog signal is substantially zero when said predetermined course is being made good.

5. An underwater navigation device as defined in claim 4, and further comprising:
   second compass means, carried by said structure, for indicating the actual heading of said structure.

6. An underwater navigation device as defined in claim 5, and wherein:
   said first directional compass means comprises a flux gate compass, said flux gate compass comprising control means for selectively conditioning said flux gate compass in accordance with said predetermined course.

7. An underwater navigation device as defined in claim 6 and wherein said indicator means comprises visual display means.

8. An underwater navigation device as defined in claim 7, and wherein said visual display means comprises a null meter.

9. An underwater navigation device as defined in claim 8, and wherein said second compass means comprises a pivoted magnetic compass.

10. An underwater navigation device comprising, in combination:
   a steerable support structure adapted to be propelled over the bottom of a body of water;
   a magnetic compass mounted on said structure and operative to indicate the actual headings thereof;
   an earth inductor compass carried by said structure and comprising a flux gate, a control transformer operative to condition said earth inductor compass to select a predetermined course desired to be made good over the bottom, and a phase detector, said earth inductor compass being operative to provide a first D.C. voltage signal that varies in polarity and magnitude with differences between said actual heading and said predetermined course;
   a doppler sonar carried by said structure and operative to provide a second D.C. voltage signal that varies in polarity and magnitude with changes in the instantaneous drift angle developed between the course then being made good over the bottom and said actual heading;
   a voltage summer connected to receive said first and second D.C. voltage signals and operative to provide a third D.C. voltage signal that is the algebraic sum thereof and varies in polarity and magnitude with differences between said course being made good and said predetermined course; and
   indicator means, responsive to said third D.C. voltage signal to provide a visual indication of direction and amount of steering correction required to steer said predetermined course.

11. An underwater navigation device as defined in claim 10, and wherein said control transformer comprises manually operated means for selecting said predetermined course.

12. An underwater navigation device as defined in claim 11, and wherein said indicator means comprises a zero-centering null meter.

* * * * *